(12) United States Patent
Nerone et al.

(10) Patent No.: US 6,621,238 B2
(45) Date of Patent: Sep. 16, 2003

(54) POWER FACTOR CORRECTION CIRCUIT WITH FASTER BUS CHARGING RATE DURING STARTUP

(75) Inventors: Louis R. Nerone, Brecksville, OH (US); David J. Kachmarik, Strongsville, OH (US); Melvin C. Cosby, Grand River, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/683,619

(22) Filed: Jan. 25, 2002

(65) Prior Publication Data

US 2003/0141827 A1 Jul. 31, 2003

(51) Int. Cl.[7] .............................. G05F 1/00; H05B 37/02
(52) U.S. Cl. ...................................... 315/307; 315/291
(58) Field of Search ................................. 315/224, 225, 315/209 R, 307, DIG. 5, 247, 291

(56) References Cited

U.S. PATENT DOCUMENTS

| | | | |
|---|---|---|---|
| 5,408,403 A | | 4/1995 | Nerone et al. ............... 363/37 |
| 5,519,289 A | * | 5/1996 | Katyl et al. .................. 315/224 |
| 5,712,536 A | | 1/1998 | Haas et al. .................. 315/247 |
| 5,811,941 A | * | 9/1998 | Barton ......................... 315/307 |
| 5,998,930 A | * | 12/1999 | Upadhyay et al. .......... 315/106 |
| 6,300,725 B1 | * | 10/2001 | Zinkler et al. ............... 315/291 |
| 6,465,991 B1 | * | 10/2002 | Chang .......................... 323/222 |

* cited by examiner

Primary Examiner—Don Wong
Assistant Examiner—Minh D A
(74) Attorney, Agent, or Firm—Fay, Sharpe, Fagan, Minnich & McKee, LLP

(57) ABSTRACT

A ballast circuit including a power factor correction circuit with an alterable d.c. bus charging rate is provided. The power factor correction circuit selectively alters the d.c. bus charging rate such that, during a startup period for the ballast circuit, the charging rate is faster than during a steady-state period. The ballast circuit including a bridge rectifier, a power factor correction circuit, a bus capacitor, and at least one inverter. The power factor correction circuit including a power factor controller, a semiconductor switch operationally coupled to an output signal of the power factor controller, a selectively alterable impedance network operationally coupled to an output of the semiconductor switch and operationally coupled to an input signal of the power factor controller, and an impedance network control circuit operationally coupled to the impedance network to selectively alter the impedance network.

14 Claims, 4 Drawing Sheets

POWER FACTOR CORRECTION CIRCUIT WITH FASTER BUS CHARGING RATE DURING STARTUP

BACKGROUND OF INVENTION

The present invention relates generally to a ballast circuit for a gas discharge lamp. More particularly, this invention relates to increasing the d.c. bus charging rate in a power factor correction circuit of the ballast circuit for a gas discharge lamp during a startup period.

A prior art circuit for supplying a load with bi-directional current includes a series half-bridge converter comprising a pair of series-connected switches that are alternately switched "on" to achieve bi-directional current flow through the load.

In order to improve the power factor of the load, the prior art power supply circuit incorporates a boost converter which receives rectified, or d.c., voltage from a full-wave rectifier, which, in turn, is supplied with a.c. voltage and current. The boost converter generates a voltage boosted above the input d.c. voltage on a capacitor of the boost converter ("the boost capacitor"), which supplies the d.c. bus voltage for powering the mentioned series half-bridge converter. The prior art boost converter includes a dedicated switch ("the boost switch") which repetitively connects an inductor of the boost converter ("the boost inductor") to ground and thereby causes current flow in the inductor, and hence energy storage in such inductor. The energy stored in the boost inductor is then directed to the boost capacitor, to maintain a desired bus voltage on such capacitor.

In the operation of the prior art boost converter, the energy stored in the boost inductor is discharged into the boost capacitor prior to the boost switch again connecting the boost inductor to ground. Operation of the boost converter as described, i.e. with complete energy discharge of the boost inductor, is known as operation in the discontinuous mode of energy storage. Prior art circuits may also operate in the continuous mode of energy storage, wherein the inductor is not to fully discharge. This allows the circuit to keep some stored energy.

Unfortunately, boost converters incorporating power factor correction use a method of limiting the current through the boost switch to control the d.c. bus voltage. The maximum value of current through the boost switch is determined by the steady-state operation of the converter under full load conditions. Initially, when power is first applied, the d.c. bus is uncharged. The rate at which the d.c. bus charges is determined by the maximum value of current allowed by the controller. If the charging rate can be increased during the initial charging of the bus, the d.c. bus voltage will reach its steady-state value sooner. This is desirable in applications where the power supply circuit is a ballast circuit and the boost converter (i.e., power factor correction circuit) supplies the d.c. bus to a plurality of inverters, each of which powers a gas discharge lamp.

Since the time it takes the load current to reach its steady-state value is proportional to the d.c. bus voltage, it is desirable for the d.c. bus voltage to reach its steady-state value sooner than in existing boost converters (i.e., power factor correction circuits).

SUMMARY OF INVENTION

In an embodiment of the present invention, a ballast circuit comprises a bridge rectifier, a power factor correction circuit operationally coupled to the bridge rectifier, wherein the power factor correction circuit sources a d.c. bus to subsequent ballast circuit components and provides a return line associated with the bus, wherein the power factor correction circuit charges the bus during a startup period at a startup charging rate and during a steady-state period at a steady-state charging rate, wherein the startup charging rate is higher than the steady-state charging rate, a bus capacitor operationally coupled to the d.c. bus and return line of the power factor correction circuit, and at least one inverter operationally coupled to the d.c. bus and return line of the power factor correction circuit.

In another embodiment of the invention, a power factor correction circuit for a ballast circuit comprises, a power factor controller with an input signal and an output signal, a semiconductor switch operationally coupled to the output signal of the power factor controller, a selectively alterable impedance network operationally coupled to an output of the semiconductor switch and operationally coupled to the input signal of the power factor controller, and a impedance network control circuit operationally coupled to the impedance network.

DETAILED DESCRIPTION

Figure 1:
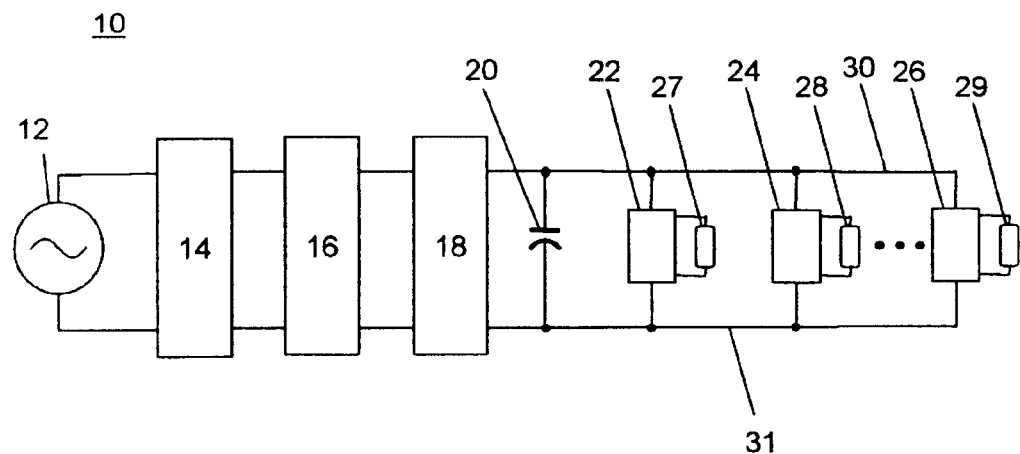
FIG. 1 is a block diagram of a ballast circuit in accordance with the present invention.

FIG. 1 shows a ballast circuit 10 in accordance with the present invention. The ballast circuit 10 is comprised of an a.c. power source 12, an electromagnetic interference (EMI) filter 14, a bridge rectifier 16, a power factor correction/peak current control circuit 18, a bus capacitor 20, and a series of inverters 22, 24, 26. Each inverter is coupled to a load 27, 28, 29. The load may be comprised of, for example, one or more gas discharge lamps. The a.c. power source 12 is filtered by the EMI filter 14 and rectified by the bridge rectifier 16. The bridge rectifier supplies d.c. voltage to the power factor correction/peak current control circuit 18. The power factor correction/peak current control circuit 18, also referred to as a boost converter, supplies power via a d.c. bus 30 and a return line 31 to the bus capacitor 20 and each of the inverters 22, 24, 26. The power factor correction/peak current control circuit 18 charges the d.c. bus 30 to a pre-determined voltage level with reference to the return line 31 at a pre-determined charging rate. The charge or voltage level of the d.c. bus 30 is reflected by the energy stored and corresponding voltage across the bus capacitor 20. The power factor correction/peak current control circuit 18 charges the d.c. bus 30 at a startup charging rate for a brief period (e.g., 100 ms) after electrical power is initially applied or cycled to the ballast circuit 10. After the initial startup period, the power factor correction/peak current control circuit 18 charges the d.c. bus 30 at a steady-state charging rate. The startup charging rate is faster than the steady-state charging rate.

Figure 2:
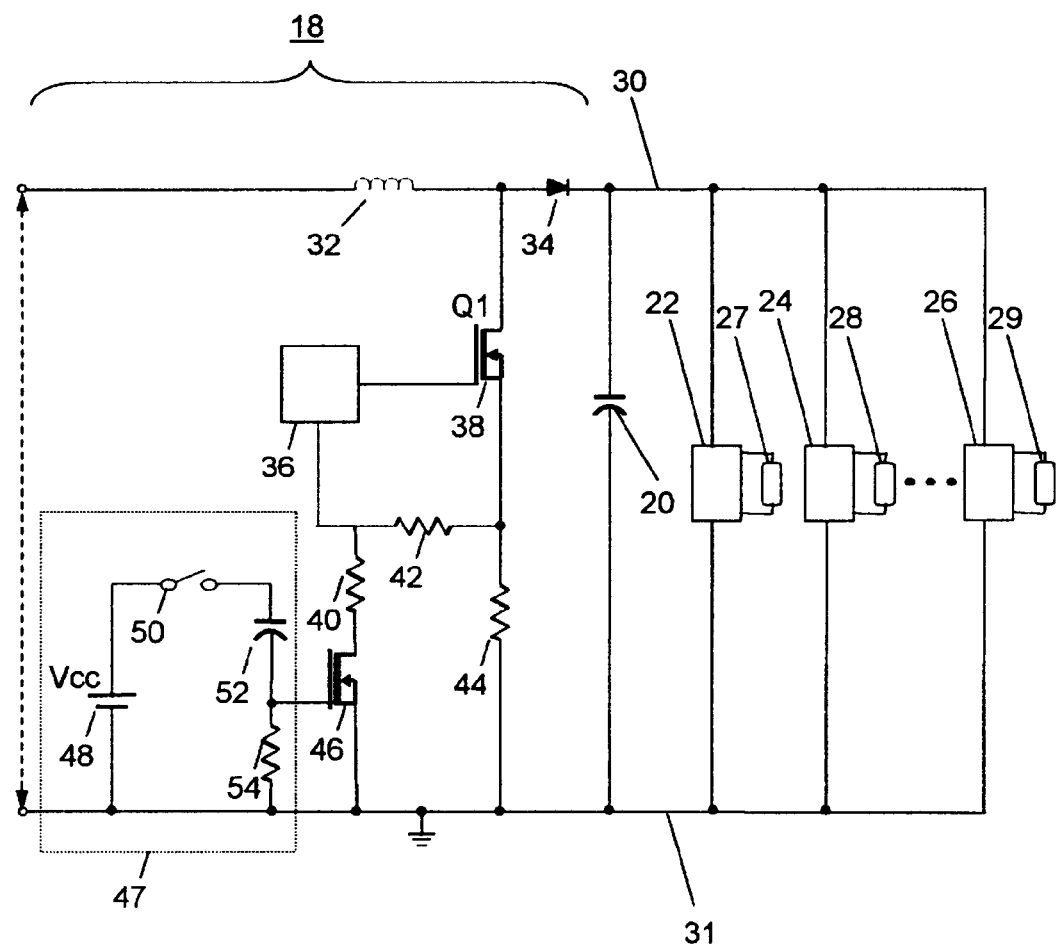
FIG. 2 is a schematic diagram showing the power factor correction/peak current control circuit of FIG. 1 in accordance with the present invention.

FIG. 2 shows the power factor correction/peak current control circuit 18, bus capacitor 20, and the series of inverters 22, 24, 26 of FIG. 1 in more detail. The power factor correction/peak current control circuit 18 is comprised of an inductor 32, a diode 34, a power factor controller 36, a semiconductor switch 38, three resistors 40, 42, 44, a semiconductor switch 46, and a resistive network control circuit 47. The resistive network control circuit 47 is comprised of a d.c. voltage source (Vcc) 48, a switch 50, a capacitor 52, and a resistor 54. Alternatively, resistors 40, 42 may be impedance devices and the control circuit 47 may be referred to as an impedance network control circuit.

The power factor controller 36 requires an input voltage that is proportional to the current flowing through semiconductor switch 38. When electrical power is first applied (i.e., beginning at t=0) switch 50 is closed, thereby applying the d.c. voltage source 48 to the series combination of capacitor 52 and resistor 54. Initially, the d.c. voltage source 48 begins to charge capacitor 52 and the maximum voltage supplied by 48 is across resistor 54. The initial voltage across resistor 54 causes semiconductor switch 46 to switch "on." With semiconductor switch 46 "on," resistor 40 is coupled to the return line 31 and a voltage divider network formed by resistor 42 and resistor 40 is placed in parallel with resistor 44. Since the maximum internal set-point of power factor controller 36 is constant, turning "on" the semiconductor switch 46 attenuates the voltage potential at the sense input to power factor controller 36 from the normal voltage developed across resistor 44 by placing the series combination of resistor 42 and resistor 40 in parallel with resistor 44 and sensing the voltage across resistor 40. Effectively, this increases the maximum current that flows through semiconductor switch 38, thereby decreasing the time to charge the bus capacitor 20.

When capacitor 52 charges to a value that causes the voltage across resistor 54 to go below the gate voltage threshold of semiconductor switch 46 4, the semiconductor switch 46 switches "off." Capacitor 52 is selected so that the semiconductor switch 46 42 remains on for a brief period (e.g., 100 ms) after electrical power is initially applied or cycled to the ballast circuit 10. This period is preferably long enough for the d.c. bus 30 to reach its steady-state level. With semiconductor switch 46 "off" (i.e., d.c. bus 30 at its steady-state level), the maximum current limit through semiconductor switch 38 is determined by the internal set-point of power factor controller 36 and unaffected by the voltage divider network (i.e., attenuator) formed by resistor 42 and resistor 40. In other words, the voltage potential at the sense input to the power factor controller 36 is based on the voltage developed across resistor 44. Cycling electrical power causes the startup process to repeat because bus capacitor 20 and capacitor 52 will discharge to nearly zero voltage when power is removed.

Figure 3:
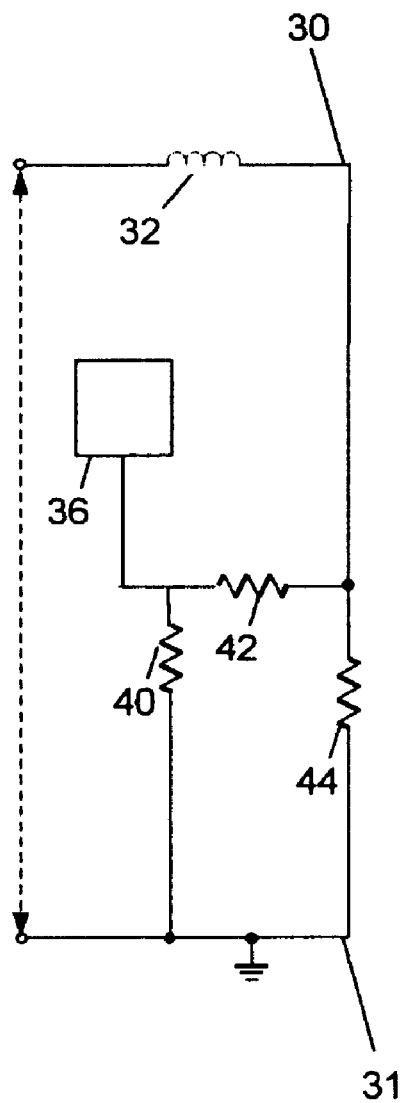
FIG. 3 is a schematic diagram of an equivalent circuit for the power factor correction/peak current control circuit of FIG. 2 during startup operations.

FIG. 3 shows an equivalent circuit 300 for the power factor correction/peak current control circuit 18 during startup operations. The circuit includes inductor 32, power factor controller 36, resistor 40, resistor 42, resistor 44. This representation reflects the power factor correction/peak current control circuit of FIG. 2 with semiconductor switches 38 and 46 both "on." If the maximum internal set-point of the power factor controller 36 is, for example, 1.7 Volts and if the impedance of resistor 40 and resistor 42, for example, is 1 K ohm, the maximum voltage across resistor 44 will be 3.4 volts. If, for example, the impedance of resistor 44 is 1 ohm the maximum allowable peak current of 3.5 amps will flow in resistor 44 and in semiconductor switch 38. The values represented in this example are relative approximations. Persons skilled in the art will understand that in actuality the values identified will be ranges based on, inter alia, the tolerances of the actual components selected for the circuit.

Figure 4:
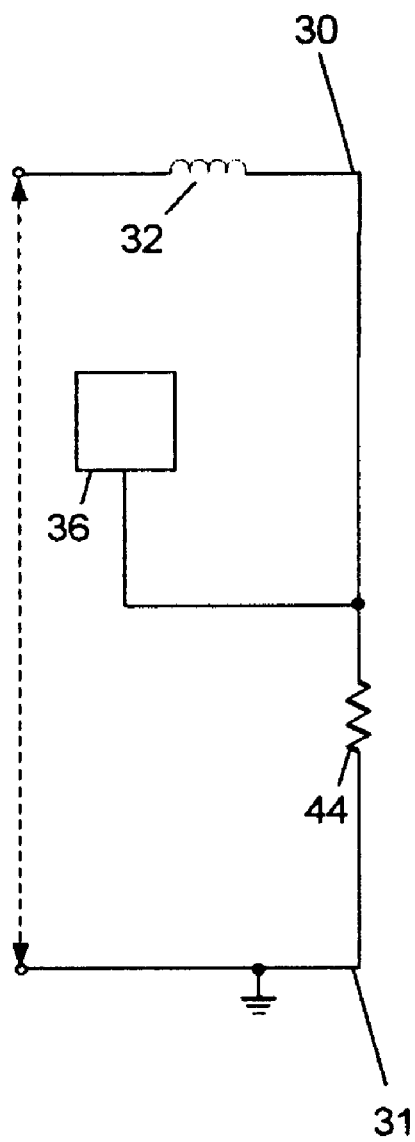
FIG. 4 is a schematic diagram of an equivalent circuit for the power factor correction/peak current control circuit of FIG. 2 during steady-state operations.

FIG. 4 shows an equivalent circuit 400 for the power factor correction/peak current control circuit 18 during steady-state operations. The circuit includes inductor 32, power factor controller 36, and resistor 44. This representation reflects the power factor correction/peak current control circuit of FIG. 2 with semiconductor switch 38 "on" and semiconductor switch 46 "off." If the maximum internal set-point of the power factor controller 36 is again, for example, 1.7 Volts and if the impedance of resistor 40 and resistor 42, for example, is 1 K ohm, the maximum voltage across resistor 44 will be 1.7 volts. If, for example, the impedance of resistor 44 is 1 ohm the maximum allowable peak current of 1.7 amps will flow in resistor 44 and in semiconductor switch 38. The values represented in this example are relative approximations. Persons skilled in the art will understand that in actuality the values identified will be ranges based on, inter alia, the tolerances of the actual components selected for the circuit.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A ballast circuit, comprising:
    a bridge rectifier;
    a power factor correction circuit operationally coupled to the bridge rectifier, wherein the power factor correction circuit sources a d.c. bus to subsequent ballast circuit components and provides a return line associated with the bus, wherein the power factor correction circuit charges the bus during a startup period with a first pre-determined current defining a startup charging rate and during a steady-state period with a second pre-determined current defining at a steady-state charging rate, wherein the first pre-determined current is higher than the second pre-determined current and the startup charging rate is higher than the steady-state charging rate;
    a bus capacitor operationally coupled to the d.c. bus and return line of the power factor correction circuit; and
    at least one inverter operationally coupled to the d.c. bus and return line of the power factor correction circuit.

2. The ballast circuit of claim 1, the power factor correction circuit further comprising:
    a power factor controller with an input signal and an output signal;
    a semiconductor switch operationally coupled to the output signal of the power factor controller;
    a selectively alterable resistive network operationally coupled to an output of the semiconductor switch and operationally coupled to the input signal of the power factor controller; and
    a resistive network control circuit operationally coupled to the resistive network.

3. The ballast circuit of claim 2, wherein the power factor controller controls the semiconductor switch in an on/off fashion using the output signal.

4. The ballast circuit of claim 2, wherein the selectively alterable resistive network is operationally coupled to the input signal of the power factor controller in a voltage divider fashion.

5. The ballast circuit of claim 2, wherein the resistive network control circuit selectively alters the resistive network in a timing fashion to cause the first pre-determined current to flow through the series combination of the semiconductor switch and the resistive network during the startup period and to cause the second pre-determined current to flow through the series combination of the switch and the resistive network during the steady-state period.

6. The ballast circuit of claim 1, the power factor correction circuit further comprising:
- a power factor controller with an input lead and an output lead;
- a first semiconductor switch with a control lead operationally coupled to the output lead of the power factor controller;
- a first resistor with a first lead operationally coupled to an output lead of the first semiconductor switch and a second lead operationally coupled to the return line;
- a first impedance device with a first lead operationally coupled to the input lead of the power factor controller and a second lead operationally coupled to the output lead of the first semiconductor switch and the first lead of the first resistor;
- a second impedance device with a first lead operationally coupled to the input lead of the power factor controller and the first lead of the first impedance device;
- a second semiconductor switch with an input lead operationally coupled to a second lead of the second impedance device and an output lead operationally coupled to the return line;
- a d.c. voltage source with a negative lead operationally coupled to the return line;
- a capacitor with a first lead operationally coupled to a positive lead of the d.c. voltage source and a second lead operationally coupled to a control lead of the second semiconductor switch; and
- a second resistor with a first lead operationally coupled to the second lead of the capacitor and the control lead of the second semiconductor switch and a second lead operationally coupled to the return line.

7. The ballast circuit of claim 6, wherein an input lead of the first semiconductor switch is for receiving a d.c. voltage signal and the output lead of the first semiconductor switch is for transmitting the d.c. voltage signal to subsequent components of the power factor correction circuit.

8. The ballast circuit of claim 6, the power factor correction circuit further comprising:
- an inductor with a first lead for receiving a d.c. voltage signal;
- a diode with a first lead operationally coupled to a second lead of the inductor and a second lead for providing the d.c. bus to subsequent components of the ballast circuit; and
- wherein the first semiconductor switch includes an input lead operationally coupled to the second lead of the inductor and the first lead of the diode.

9. A power factor correction circuit for a ballast circuit, the power factor correction circuit comprising:
- a power factor controller with an input signal and an output signal;
- a semiconductor switch operationally coupled to the output signal of the power factor controller;
- a selectively alterable impedance network operationally coupled to an output of the semiconductor switch and operationally coupled to the input signal of the power factor controller; and
- an impedance network control circuit operationally coupled to the impedance network, wherein the impedance network control circuit selectively alters the impedance network in a timing fashion to cause a first pre-determined current to flow through the series combination of the switch and the impedance network during a startup period and to cause a second pre-determined current to flow through the series combination of the switch and the impedance network during a steady-state period.

10. The power factor correction circuit of claim 9, wherein the power factor controller controls the semiconductor switch in an on/off fashion using the output signal.

11. The power factor correction circuit of claim 9, wherein the selectively alterable impedance network is operationally coupled to the input signal of the power factor controller in a voltage divider fashion.

12. A power factor correction circuit for a ballast circuit, the power factor correction circuit comprising:
- a power factor controller with an input lead and an output lead;
- a first semiconductor switch with a control lead operationally coupled to the output lead of the power factor controller;
- a first resistor with a first lead operationally coupled to an output lead of the first semiconductor switch and a second lead operationally coupled to a return line;
- a first impedance device with a first lead operationally coupled to the input lead of the power factor controller and a second lead operationally coupled to the output lead of the first semiconductor switch and the first lead of the first resistor;
- a second impedance device with a first lead operationally coupled to the input lead of the power factor controller and the first lead of the first impedance device;
- a second semiconductor switch with an input lead operationally coupled to a second lead of the second impedance device and an output lead operationally coupled to the return line;
- a d.c. voltage source with a negative lead operationally coupled to the return line;
- a capacitor with a first lead operationally coupled to a positive lead of the d.c. voltage source and a second lead operationally coupled to a control lead of the second semiconductor switch; and
- a second resistor with a first lead operationally coupled to the second lead of the capacitor and the control lead of the second semiconductor switch and a second lead operationally coupled to the return line.

13. The power factor correction circuit of claim 12, wherein an input lead of the first semiconductor switch is for receiving a d.c. voltage signal and the output lead of the first semiconductor switch is for transmitting the d.c. voltage signal to subsequent components of the power factor correction circuit.

14. The power factor correction circuit of claim 12, the power factor correction circuit further comprising:
- an inductor with a first lead for receiving a d.c. voltage signal;
- a diode with a first lead operationally coupled to a second lead of the inductor and a second lead for providing a d.c. bus to subsequent components of the ballast circuit; and
- wherein the first semiconductor switch includes an input lead operationally coupled to the second lead of the inductor and the first lead of the diode.

* * * * *